United States Patent [19]

Wakabayashi

[11] 3,894,629

[45] July 15, 1975

[54] CONVEYOR

[75] Inventor: Takao Wakabayashi, Osaka, Japan

[73] Assignee: Nakanishi Metal Works Co., Ltd., Japan

[22] Filed: Nov. 1, 1973

[21] Appl. No.: 411,767

[30] Foreign Application Priority Data

Nov. 4, 1972 Japan.............................. 47-110551
Nov. 4, 1972 Japan.............................. 47-110552
Nov. 4, 1972 Japan.............................. 47-110554

[52] U.S. Cl. ........................... 198/170; 104/172 B
[51] Int. Cl.² ........................................ B65G 19/00
[58] Field of Search ........... 198/170, 173, 168, 172, 198/174, 34; 104/172 B

[56] References Cited
UNITED STATES PATENTS

3,661,094  5/1972  Pachuta.......................... 104/172 B
3,799,327  3/1974  Schulz................................ 198/170

Primary Examiner—Evon C. Blunk
Assistant Examiner—Douglas D. Watts
Attorney, Agent, or Firm—Armstrong, Nikaido & Wegner

[57] ABSTRACT

A conveyor adapted to accumulate articles includes a number of supporting rollers arranged in two rows longitudinally thereof, a drive chain interposed between the two rows of supporting rollers, pushers tiltably mounted each at the approximate midportion of its length on the drive chain at specified spacing and each having an upper projection projecting upward from the chain to engage the article and a lower projection carrying a roller and projecting downward from the chain, and levers tiltably mounted each at the approximate midportion of its length on the drive chain and positioned in front of the pushers in mating combination therewith, each of the levers being adapted to be pushed down by contact with a stopped article while travelling with the drive chain and to thereby tilt the mating pusher. Normally, both the pushers and levers are maintained in raised position by gravity. In a specified portion of the conveyor, there is disposed a stopping device having a cam upwardly movable to come into contact with and push up the roller of the pusher and to thereby position the upper projection thereof below the upper ends of the supporting rollers and downwardly movable out of contact with the lower end of the pusher. Normally, the upper end of the pusher tilting lever is positioned at a lower level than the upper end of the pusher. At the front end portion of the conveyor, guide rails are positioned at a lower level than the other portions thereof, over a section in excess of the dimension of the article in the direction of travel of the article.

9 Claims, 17 Drawing Figures

FIG. 15 ns
CONVEYOR

BACKGROUND OF THE INVENTION

The present invention relates to conveyors, more particularly to a conveyor incorporating therein a mechanism by which a pusher for advancing an article to be conveyed is engaged with and disengaged from the article.

Throughout the specification and the appended claims, the terms "front" or "forward" and "rear" or "rearward" are used with respect to the direction of travel of the conveyor. Thus "forward" refers to the direction of advance of the conveyor, while by "rearward" is meant the direction opposite thereto.

In the case where articles are transported on conveyors, there arises a need to stop the articles in the course of conveying operation at an intermediate position of the path of travel of the articles for working, inspection, testing or like purposes. On such occasion, it is more convenient to accumulate a number of articles in the form of a row of closely arranged articles than to leave them separated from each other. To assure such convenience, a conveyor has already been known which comprises a drive chain having a number of pushers mounted thereon at specified spacing and engageable with and disengageable from the articles to be conveyed and rotatable supporting members adapted to merely support the articles so as to accumulate the articles, as disclosed in Publication of Japanese Pat. No. 31255/69. The conventional conveyor disclosed includes dogs or pushers each extending upward obliquely rearward longitudinally of the conveyor and having a lower end pivoted to the drive chain and an upper end projecting above the supporting rollers to draw an article in engagement therewith. Accordingly, when advancing the article in engagement therewith, the pusher is subjected to a downward moment and therefore tends to release the article. To prevent such disengagement, it is necessary to use a spring which acts to push up the upper end of the pusher all the time. However, use of the spring entails the following drawback. If the spring force is low, the upper end of the pusher may possibly turn downward out of engagement with the article when the pusher is subjected to the load of the article, whereas a spring with too strong a force will hold the pusher engaged with the article with a great pressure, making it difficult to bring the pusher out of engagement with the article smoothly.

SUMMARY OF THE INVENTION

The object of this invention is to provide a conveyor having article engaging and disengaging means free of the problem described above. The conveyor of this invention comprises a number of rotatable supporting members arranged in two rows longitudinally thereof, a drive chain interposed between the two rows of supporting members, pushers tiltably pivoted to the drive chain each at the approximate midportion of its length and spaced apart by a distance at least longer than articles to be conveyed and pusher tilting levers tiltably pivoted to the drive chain each at the approximate midportion of its length and positioned in front of the pushers in mating combination therewith, each of the pushers having an upper projection upwardly extending obliquely forwardly of the pivot therefor and engageable with the article, a lower projection serving as a weight and a front projection extending toward the lever, the pusher being prevented from turning rearward when in engagement with the article, each of the levers having an upper projection extending upward from the pivot therefor and contactable with the rear side of the article, a lower projection serving as a weight and a rear projection extending toward the pusher to overlap the front projection thereof, the lever being pushable downward by contact with a stopped article on the conveyor while travelling with the drive chain and to thereby tilt the mating pusher downward, whereby the articles and pushers can be engaged with and disengaged from each other for accumulation with high reliability and smoothness.

This invention will be described below in greater detail with reference to the accompanying drawings.

DESCRIPTION OF THE PREFERRED EMBODIMENT

Figure 1:
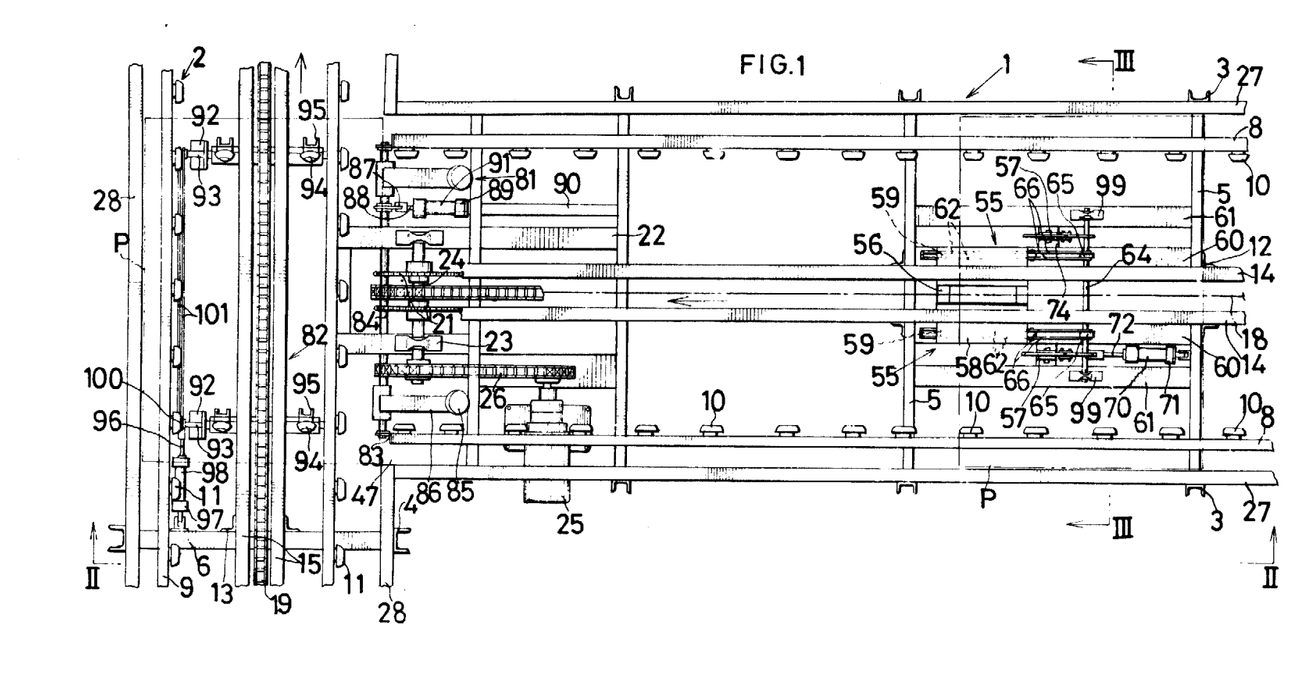
FIG. 1 is a plan view showing an embodiment of this invention wherein the T-shaped junction of a first conveyor and a second conveyor is illustrated.
Figure 2:
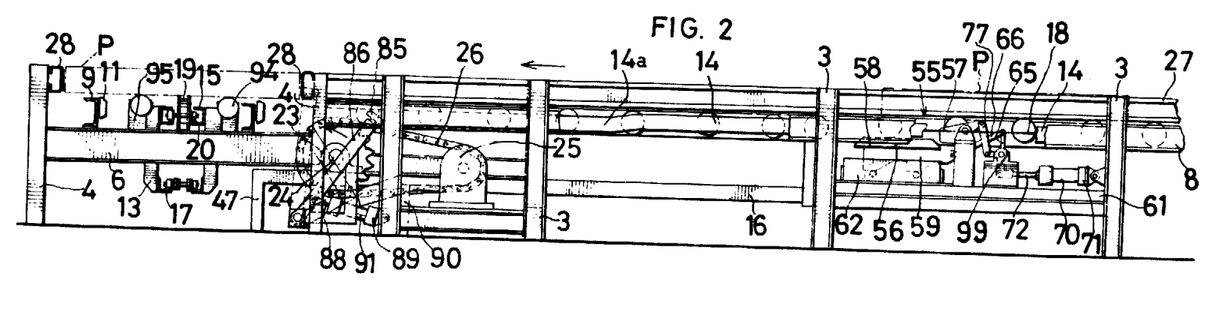
FIG. 2 is a view in section taken along the line II—II in FIG. 1, part of the first conveyor being broken away.
Figure 3:
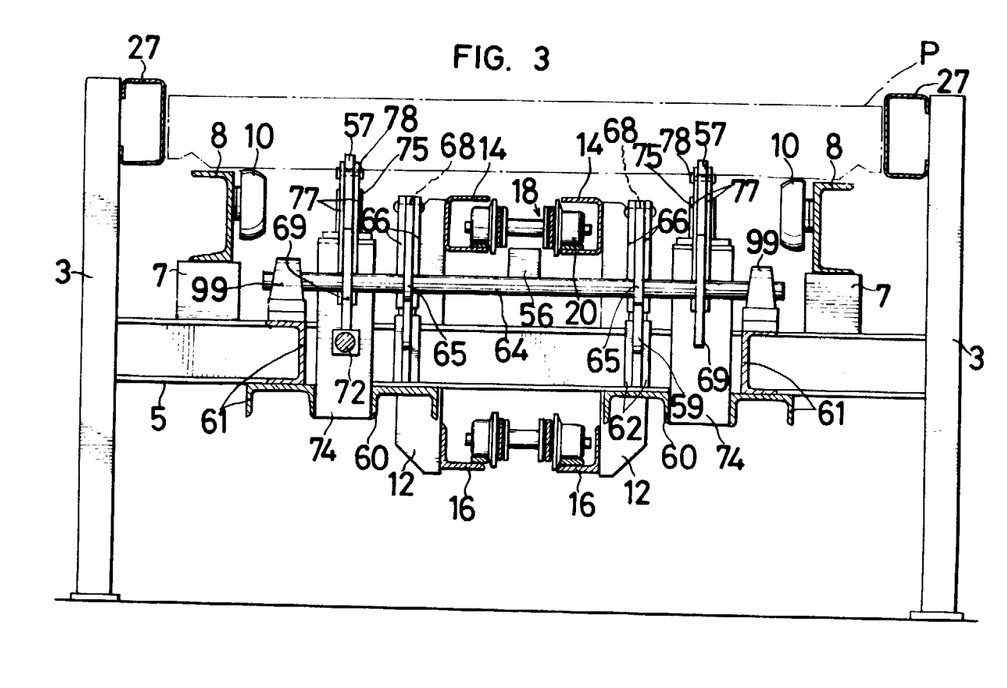
FIG. 3 is an enlarged view in section taken along the line III—III in FIG. 2.
Figure 4:
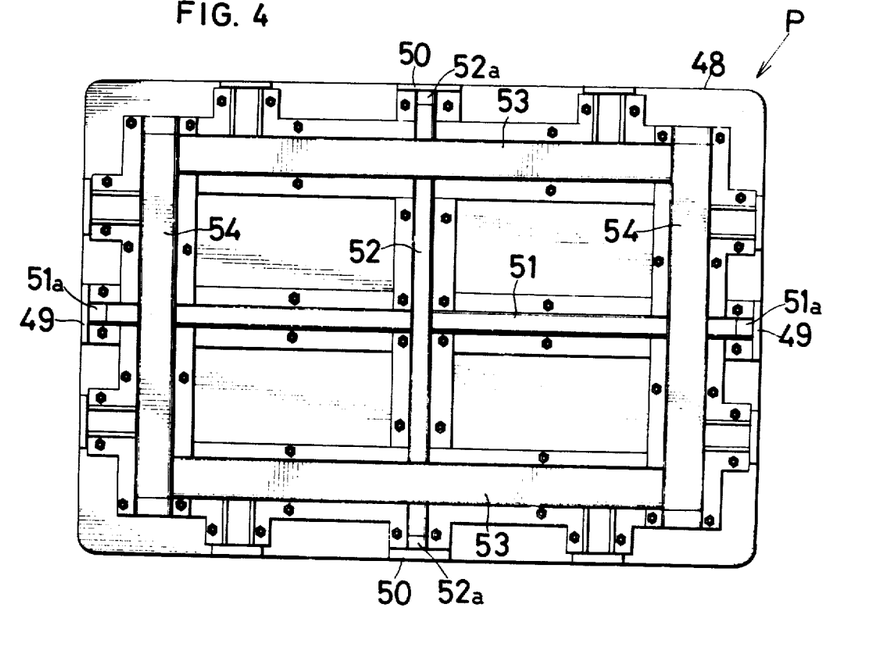
FIG. 4 is a bottom view of a pallet which is the article to be conveyed.
Figure 5:
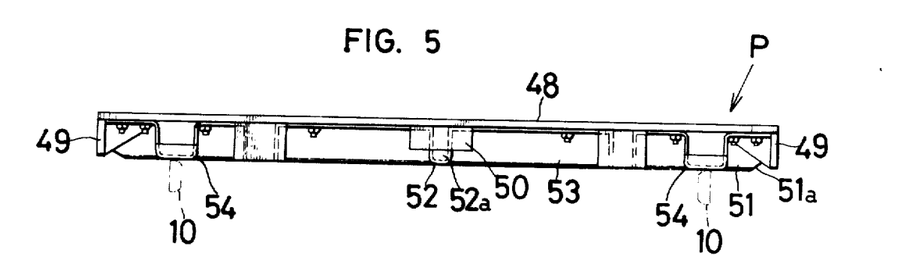
FIG. 5 is a side elevation of the pallet.
Figure 6:
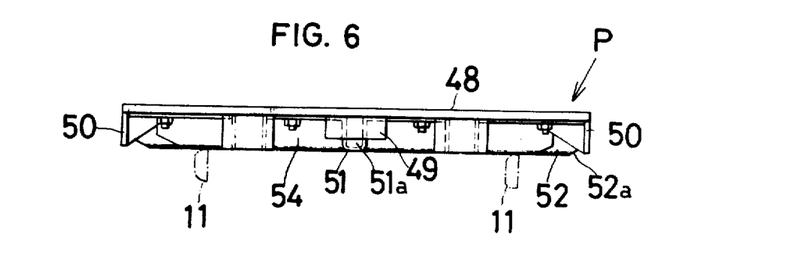
FIG. 6 is a front view of the pallet.
Figure 7:
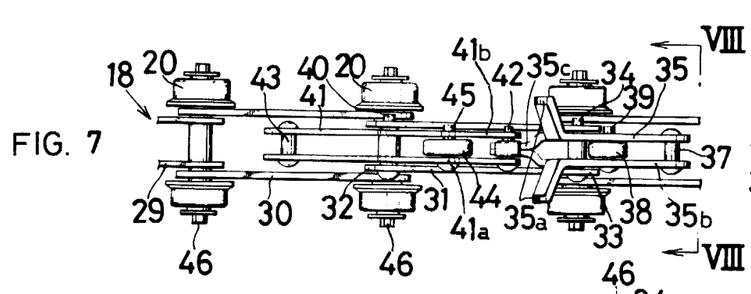
FIG. 7 is a plan view on an enlarged scale showing part of a drive chain having a pusher and a pusher tilting lever in combination therewith.
Figure 8:
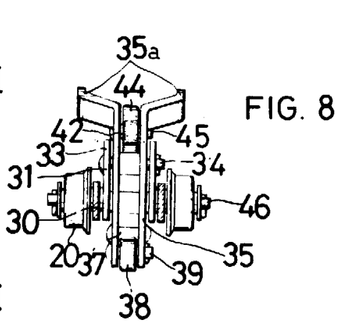
FIG. 8 is a view in section taken along the line VIII—VIII in FIG. 7.

With reference to FIGS. 1 to 3, there is shown a conveyor system including a first conveyor 1 for conveying articles and a second conveyor 2 disposed at one end of the first conveyor 1 transversely thereof for receiving the articles from the first conveyor 1. Both the conveyors 1 and 2 include posts 3 and 4 spaced apart by specified distances transversely thereof in pairs and disposed at predetermined spacings longitudinally of the conveyors. Beams 5 and 6 extend between and secured to the corresponding transverse pairs of posts 3 and 4 at the approximate middle of height of each post.

Mounting plates 7 are fixed vertically to one side surface of each beam 5 toward the opposite ends of the beam respectively. Longitudinal bars 8 at right angles to the beams 5 and extending in parallel to each other lengthwise of the first conveyor 1 are fixed to the upper ends of the mounting plates 7. Longitudinal bars 9 similar to the bars 8 of the first conveyor 1 are fixed directly to the upper surfaces of the beams 6, the bars 9 being positioned at a level lower than the bars 8. A number of support rollers 10 and 11 are mounted on each of the longitudinal bars 8 and 9 at specified spacings longitudinally thereof. Toward the midportions of beams 5 and 6 pairs of vertical angle bars 12 and 13 are secured to the beams respectively as if in suspension. Secured to the upper ends of the angle bars 12 and 13 are upper rails 14 and 15 extending longitudinally of the conveyors 1 and 2 perpendicular to the beams 5 and 6 and each having a U-shaped cross section, with their opening sides opposing each other. Like the upper rails 14 and 15, lower rails 16 and 17 L-shaped in cross section are secured to the angle bars 12 and 13 at their lower ends. At the center of the conveyors 1 and 2, endless chains 18 and 19 extend between and in parallel to the opposing rows of support rollers 10 and 11, the chains being positioned lower than the rollers. The endless chains 18 and 19 are provided on the opposite sides with rollers 20 rollable along upper and lower rails 14, 16 and 15, 17, the rollers 20 being mounted on each connecting portion of the links constituting the chains. A pair of sprocket wheels 21 around which the chain 18 is reeved (rear sprocket wheels, not shown) are mounted on a shaft 24 supported by bearings 23 on frames 22 and are in engagement with the rollers 20 on the chain 18. The shaft 24 is driven by an electric motor 25 through chain and sprocket wheel transmission means 26, in a counterclockwise direction in FIG. 2, the upper part of the chain 18 being travellable in the direction of arrows in FIGS. 1 and 2. Like chain 18, the chain 19 is driven in such direction that the upper part thereof travels in the direction of arrow in FIG. 1. Pairs of guide rails 27 and 28, C-shaped in cross section, are secured to the opposing rows of posts 3 and 4 arranged longitudinally of the conveyors 1 and 2 at the inner sides of upper ends of the posts. The openings of the rails are directed outwardly of the conveyors. At the junction of the first conveyor 1 and the second conveyor 2, one of the guide rails 28 of the second conveyor 2 positioned toward the first conveyor 1 is partially removed over a distance corresponding to the space between the two guide rails 27 of the first conveyor 1 to form an opening 47.

FIGS. 7 to 10 show the details of the drive chains 18 and 19, especially the pushers and levers for tilting the pushers. Each of the chains 18 and 19 comprises pairs of inner links 29 and pairs of outer links 30 arranged alternately and connected together by pins 46 each carrying the rollers 20 at its opposite ends respectively. Inner links 31 spaced by a distance greater than the length of articles P are formed at their opposite ends with upstanding portions 32 and 33 unlike the other inner links 29. Each pusher 35 is tiltably mounted, at an intermediate portion of its length, on the rear upstanding portions 33 by means of a pivot 34. The pusher 35 is composed of two plates connected together by connecting pins 36 and 37 and spaced by a predetermined distance and has an upper projection 35a extending sidewise and projecting obliquely upward, the projection being engageable with the article P, a lower projection 35b of a greater width carrying a roller 38 on a pin 39 at its lower end and projecting downward from the chain 18, and a front projection 35c extending horizontally forward approximately from the position of the pivot 34. A tiltable lever 41 mating with the pusher 35 to tilt the same is mounted, at an intermediate portion of its length, on the front upstanding portions 32 by means of a pivot 40. The lever 41 is composed of two plates connected together by pins 42 and 43 and spaced by the same distance as the two plates of the pusher 35. The lever 41 has an upper projection 41a carrying a roller 44 on a pin 45 at its upper end, a rear projection 41b extending substantially horizontally from the upper projection 41a to above the pusher 35 and overlapping the front projection 35c of the pusher 35, and a lower projection 41c having a lower end slightly projecting from the lower end of the links 30 of the chain 18 and having a large width. Both the pusher 35 and lever 41 are normally maintained in raised position under gravity acting on the portions thereof under the pivots 34 and 40 respectively, and the vertical front surface of the lower projection 35b and the vertical rear surface of the lower projection 41c abut against the pins 46 positioned immediately below the pivots 34 and 40 respectively, whereby they are made retainable in position. More specifically, the pins 46 serve as stoppers for preventing the upper projection 35a of the pusher 35 from turning rearward from the raised position and for preventing the upper projection 41a of the lever 41 from turning forward, respectively. It is to be noted that the upper end of upper projection 35a of the pusher 35 is positioned above the roller 44 of the lever 41. The article P to be conveyed by the conveyors 1 and 2 is a pallet of special construction to be described later. It is transported on the first conveyor 1 with its width positioned longitudinally of the conveyor 1 and then on the second conveyor 2 with its length positioned longitudinally of the conveyor 2. The article P is supported on the rollers 10 and 11 and travels with the drive chains 18 and 19 by virtue of engagement with the pushers 35 on the drive chains 18 and 19, with its side surfaces guided by the guide rails 27 and 28.

In the present embodiment which is given for illustrative purposes only, the article P to be conveyed is exemplified as the pallet referred to above, which is specifically shown in FIGS. 4 to 6 and FIGS. 9 to 11. The pallet comprises a rectangular loading plate 48 as a main body. Projecting downward from the under surface of the loading plate 48 at the midportions of its four sides are lugs 49 and 50 with which the upper projections 35a of the pushers 35 on the drive chains 18 and 19 are engageable from inside. Rails 51 and 52 of inverted hatlike cross section for rolling contact with the roller 44 of each lever 41 extend between the pair of lugs 49 opposing each other lengthwise of the loading plate 48 and between the pair of lugs 50 opposing widthwise of the loading plate, respectively. These rails are secured to the under surface of the loading plate 48. The rails 51 and 52 have a width which is smaller than the space between the two upwardly projecting plate portions 35a of the pusher 35 and are formed, each at its opposite ends, with upwardly slanting portions 51a and 52a for permitting the roller 44 to come into or out of rolling contact with the rails smoothly. Of course, the lugs 49 and 50 have a greater width than the rails 51 and 52 so that the upper projection of the pusher 35 can contact therewith. Further to enable the roller 44 to come into or out of rolling contact with the rails, the lower ends of the lugs 49 and 50 coincide with the outer ends of the slanting portions 51a and 52a. The loading plate 48 is fixedly provided on its under surface with pairs of parallel slider members 53 and 54 of inverted hatlike cross section for moving contact with the supporting rollers 10 and 11 included in the first and second conveyors 1 and 2 respectively. The lower ends of the slider members 53 and 54 and those of the rails 51 and 52 are all included in the same plane and, where any two of these members or rails intersect each other, one of them is partially cut away at the intersection to render them flush with each other. The lugs 49 and 50 are symmetrically disposed in pairs so as to render the pallet usable reversibly with respect to the opposite sides. Workpieces or the like to be conveyed are placed on such pallet and are sent forward on the conveyors 1 and 2.

Figure 11:
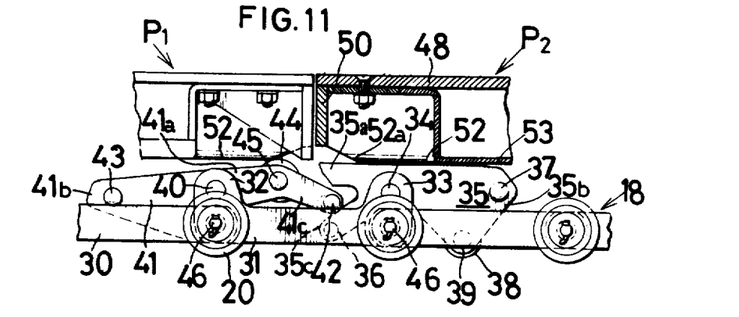
FIG. 11 is a side elevation showing the drive chain of FIG. 7 as the articles are in accumulated state, the front and rear articles being shown partially, with the latter illustrated in vertical section.

While the articles P are being conveyed on the second conveyor 2 continuously, the article P to be transferred from the first conveyor 1 onto the second conveyor 2 must be stopped temporarily. To this end, stopping means 55 is disposed some distance rearward from the front end of the first conveyor 1 as shown in FIGS. 1 and 2 and FIGS. 9 and 10. The stopping means mainly comprises a cam 56 and coasting arresting dogs 57, the cam 56 being positioned below the drive chain 18 longitudinally in alignment therewith and movable into or out of the path of travel of the rollers 38 at the lower ends of the pushers 35, the coasting arresting dogs 57 being disposed on the opposite sides of the cam 56 rearwardly thereof and movable, in operative relation to the cam 56, into or out of the path of travel of the rail 51 on the under surface of the loading plate 48 which rail is perpendicular to the direction of advance of the article P, i.e. the pallet. The cam 56 is trapezoidal in side elevation and is fixedly mounted on a base plate 58 centrally thereof. Fixed to the under surface of the base plate 58 toward its opposite sides are legs 59 in parallel to the drive chain 18. Each of the legs 59 has a pair of lower horizontal portions 59a at the front and rear thereof, a pair of upwardly slanting portions 59b continuous therewith in the rear of the portions 59a respectively, upper horizontal portions 59c that follow the slanting portions 59b and a rear projection 59d projecting rearward from the base plate 58. The stopping means 55 has pairs of inner and outer frames 60 and 61. A pair of upright plates 62 are mounted on each of the inner frames 60, with the leg 59 interposed therebetween. A pair of support rollers 63 extend between the upright plates 62 at front and rear portions thereof. Normally, the rollers 63 are in contact with the upper horizontal portions 59c on the legs 59 respectively to support and retain the cam 56 in its lowered position. To the rear of the leg 59, each of the outer frames 61 is provided thereon with a bearing 99 receiving a rod 64. Flat slanting levers 65 are fixedly mounted, each at the midportion of its length, on the rod 64 and are positioned just behind the legs 59 respectively. A pair of parallel link bars 66 interconnect the upper end of each lever 65 and the rear projection 59a of each leg 59 and are pivoted to these members by pins 67 and 68. Outside each of the flat levers 65, a bell crank lever 69 is secured to the rod 64 in an inverted V-shaped form. Located behind one of the bell crank levers 69 is a hydraulic cylinder 70 having a base end 71 pivoted to the beam 5 and a piston rod 72 whose distal end is pivoted to one end of the lever 69 by a pin 73. The coasting arresting dog 57 is tiltably supported by a pivot 76 on a bearing 75 mounted on an upwardly extending support 74 interposed between and fixed to the inner and outer frames 60 and 61. A pair of parallel link bars 77 extend between the rear end of the dog 57 and the other end of the bell crank lever 69 and are pivoted thereto by pins 78 and 79. The bars 77 hold the dog 57 in a fallen position. At the front end of the dog 57, there is formed a lower projection 80 which is engageable with the front surface of the support 74 when the dog 57 is raised upward rearwardly. Thus the support 74 coacts with the projection 80 as a stopper to prevent the upper end of the dog 57 from turning forward by being pushed by a coasting article P. While the articles P are being sent out from the first conveyor 1 onto the second conveyor 2 in succession, the piston rod 72 of the hydraulic cylinder 70 is held retracted to retain the cam 56 in its lowered position and the coasting arresting dogs 57 in the fallen position as described above. Accordingly, the articles P advance with the drive chain 18 free of trouble by virtue of engagement with the pushers 35 (see FIG. 9). When the pusher 35 comes into engagement with the article P to advance the same, an upward moment acts on the pusher 35 which assures the engagement of the pusher with the article P with higher reliability. When there arises a need to stop the article P for the reason already stated, the hydraulic cylinder 70 functions to extend the piston rod 72, which in turn raises the flat levers 65 to draw the cam 56 rearward by way of the link bars 66. At this time, the positions where the legs 59 of the cam 55 are in contact with the support rollers 63 shift from the upper horizontal portions 59c to the slanting portions 59b and then to the lower horizontal portions 59a, this bringing the cam 56 to an elevated position. At the same time, the bell crank levers 69 which are fixed to the same rod 64 as the flat levers 65 are brought from the inverted V-shaped posture to an inverted L-shaped posture, causing the link bars 77 to push up the upper ends of the coasting arresting dogs 57 and to thereby raise the dogs 57. When thus elevated, the cam 56 is brought close to the drive chain 18 and into the path of travel of the rollers 38 at the lower ends of the pushers 35. Consequently, as the roller 38 on the pusher 35 advancing in engagement with an article P rolls up on the rear slanting surface of the cam 56, the pusher 35 turns about the pivot 34, bringing up the lower projection 35b and conversely lowering the upper projection 35a, and moves out of engagement with the front lug 50 of the article P. Thus inclined, the pusher 35 releases the article P, which therefore remains on the supporting rollers 10. When turning downward, the pusher 35 pushes, with its upper projection 35a, the rear projection 41b of the pusher tilting lever 41 from above and inclines the lever 41. When released, the article P tends to advance some distance due to inertia, but just at this time, the dogs 57 come into contact with the front surface of the rail 51 on the article P, preventing the article from coasting to make it sure to bring the same to a stop at a specified position (see FIG. 10). If the article is stopped in this way, the succeeding articles will be brought to a halt one after another in accumulated manner as illustrated in FIG. 11.

As stated above, a first article $P_1$ is stopped at the specified position. By the "first article" herein referred to is meant one of a number of travelling articles which is to be stopped first. When the first article $P_1$ is thus stopped, a second article $P_2$ and the succeeding articles are still travelling with the drive chain 18. The lever 41 for the pusher 35 engaging the second article $P_2$ then comes into contact with the preceding first article $P_1$, which in turn inclines the advancing lever 41, whereupon the rear projection 41b thereof depresses the front projection 35c of the pusher 35 from above. As a result, the pusher is inclined, with its upper projection brought out of engagement with the second article $P_2$, which therefore comes to a halt adjacent the first article $P_1$ in accumulated state. The roller 44 on the lever 41 advances in rolling contact with the under surface of rail 52 on the first article $P_1$. The upper projection 35a of the pusher 35, located at a lower level than the roller 44 when in tilted position, will not come into contact with the first article $P_1$. When the lever 41 moves past the front end of the first article $P_1$, the following pusher 35 is subsequently inclined by the cam 56 in its elevated position, so that it remains inclined until it moves over the cam. Accordingly the pusher 35 will not rise to engage the lug 50 of the article $P_1$. As the drive chain 18 travels forward, a third article and the following articles are brought to halt one after another, each in end-to-end contact with the preceding article, in accumulated fashion.

Figure 9:
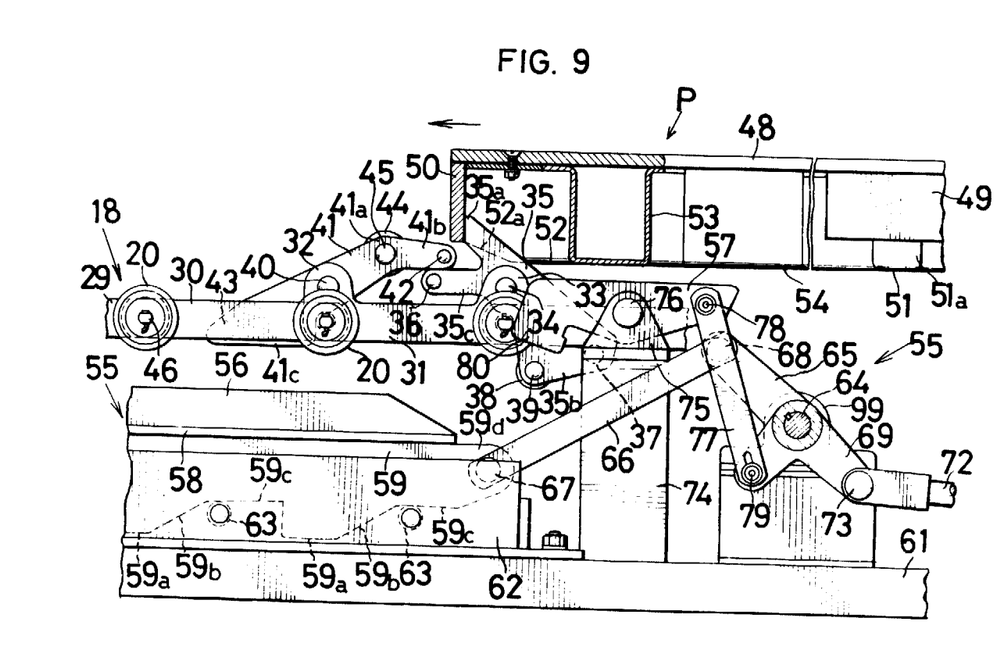
FIGS. 9 and 10 are enlarged side elevations showing article stopping means disposed close to the front end of the first conveyor, FIG. 9 showing the means as the article is almost brought to a halt, FIG. 10 showing the means as the article is in its stopped position.
Figure 10:
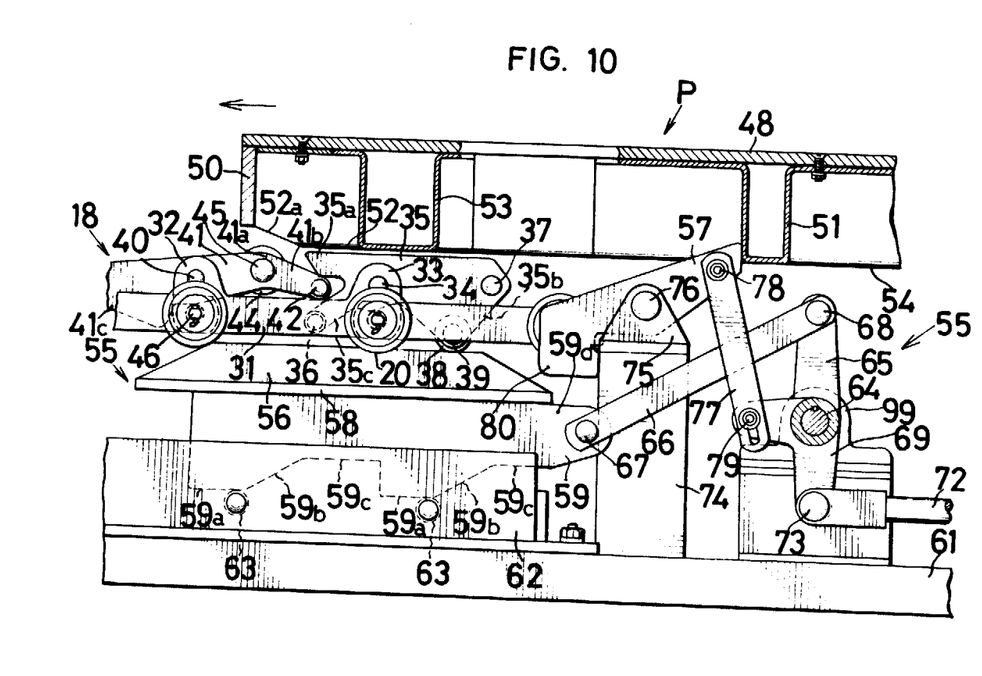

To move a group of stopped articles P again, the hydraulic cylinder 70 is operated to retract the piston rod 72, whereby the stopping means 55 operates in the reverse manner to the foregoing. As seen in FIG. 9, the cam 56 moves down to its lowered position and, at the same time, the coating arresting dogs 57 are fallen, permitting trouble-free passage of the articles P. Consequently, the lever 41 advancing from behind rises under gravity the moment when it passes by the lug 50 of the first article $P_1$ since it is freed from the pressure of the article $P_1$ at that moment. The rear projection 41b of the lever 41 therefore moves up, freeing the front projection 35c of the pusher 35 from the depressing engagement therewith and accordingly allowing the pusher 35 to rise under gravity, whereupon the upper projection 35a comes into engagement with the lug 50 of the article $P_1$ to advance the article $P_1$. It will be apparent that as the first article $P_1$ moves forward which has been serving as a stopper, the succeeding pushers 35 come into engagement with the second and following articles $P_2$ one after another, respectively, to thereby bring the articles P into travel.

It will be readily understood that the stopping means 55 operable as above will be installed at the desired portion of the first conveyor 1 and the second conveyor 2 for the accumulation of articles. The stopping means need not necessarily have the construction shown but may alternatively be means movable into and out of the path of travel of the upper projection 41a of the lever 41 so as to depress the same and to thereby fall down the lever 41, causing the pusher 35 to incline with the falling movement.

Figure 12:
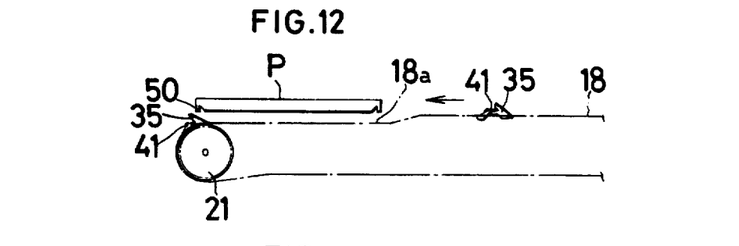
FIGS. 12 to 14 are schematic side elevations of the front end of the drive chain showing the operation to send out the article from the first conveyor.
Figure 13:
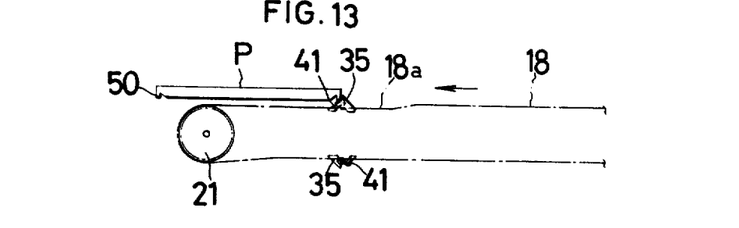
Figure 14:
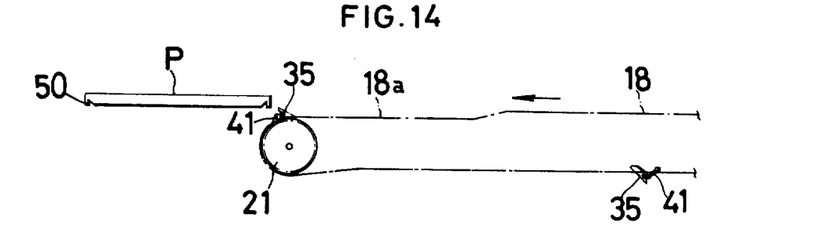

With the first conveyor 1, each article P is supported on the rollers 10 and is advanced by virtue of engagement with the pusher 35 on the drive chain 18 while the lengthwise sides thereof are being guided by the rails 27. When approaching the front end of the first conveyor 1, the article is freed from engagement with the pusher 35. If the path of travel of upper side of the drive chain 18 extends to the front end of the first conveyor 1 at the same level, the pusher 35 which has been in engagement with the front lug 50 of the article P would be moved out of engagement with the article P when the drive chain 18 travels around the periphery of the sprocket wheel 21 as will be apparent from the drawing, allowing the article P to remain on the support rollers 10 instead of being forwarded toward the second conveyor 2. Supposedly, the succeeding pusher would push the article P forward, but the pusher-tilting lever 41 positioned in front of the particular pusher 35 will then come into contact with the article P to move the pusher 35 downward before the pusher 35 engages the rear portion of the stopped article P. Consequently, the succeeding pusher 35 will pass away under the bottom of the article P without engagement. Accordingly, in the front end portion of the first conveyor 1, the path of travel of the drive chain 18 is partly positioned at a level lower than the rest of the path, over a section longitudinally at least greater than the width of the article P, so as to keep the lever 41 out of contact with the article although the pusher 35 is engageable with the article. To lower the path of movement of the drive chain 18 in this way, the upper rails 14 for guiding the drive chain have lower level portions 14a in their front ends (see FIG. 2). By being guided by the lower level portions 14a of the upper rails 14, the drive chain 18 travels at a lower level as indicated at 18a. The article P is therefore sent out toward the second conveyor 2 in the following manner as illustrated in FIGS. 12 to 14. When the pusher 35 comes to the position of the sprocket wheel 21 rotating in a counterclockwise direction in the drawings while advancing the article P, the pusher 35 moves out of the lug 50 of the article P as the wheel further rotates, leaving the article P on the supporting rollers 10 temporarily (see FIG. 12). On the other hand, a succeeding pusher 35 advances as the drive chain 18 moves forward. For convenience, suppose this pusher 35 is out of engagement with the article. Over the lower level section 18a of the drive chain 18, the pusher tilting lever 41 disposed in front of the pusher 35 in combination therewith travels at a level lower than the under surface of the article P out of contact therewith, permitting the pusher 35 to remain in its raised position. Of course, the pusher 35 also travels at a lower level over the lower level section 18a but still has its upper projection 35a maintained at a level where it is engageable with the article P. Thus the projection 35a engages the rear side of the article P, with the result that the succeeding pusher 35 advances the stopped article P on the supporting rollers 10 (see FIG. 13). Subsequently, when turning downward along the sprocket wheel 21, this pusher 35 moves out of engagement with the rear side of the article P. At this time, the article P has almost been sent out from the first conveyor 1 (see FIG. 14). In the case where the succeeding pusher 35 is advancing the following article P, the following article P comes into contact with the preceding article P, pushes out the same from the first conveyor 1 and then stops at the front end of the conveyor 1. In the same manner as above, this article will be sent out subsequently.

Figure 15:
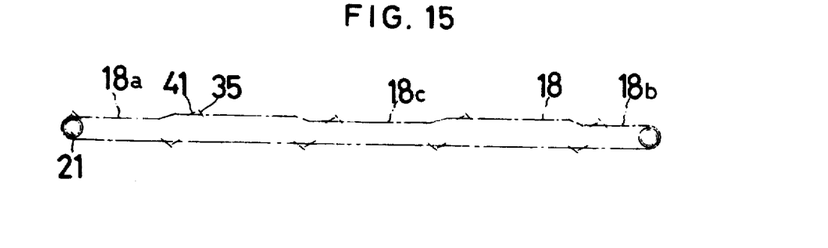
FIG. 15 is a schematic side elevation showing a modified example of the path of travel of the drive chain.

In the case where the drive chain includes the above-stated lower level section, the pusher tilting lever 41 provided in front of the pusher 35 in combination therewith will be left out of interference with the article P, so that the article P can be disengaged from the pusher 35 to forward the article more quickly than the speed of travel of the drive chain 18 manually or by some other means. In a portion of the conveyor where such quick transport operation is desired, the drive chain may include such lower level section. FIG. 15 shows an example wherein the drive chain 18 has lower level sections 18a, 18b and 18c at the front end, rear end and intermediate portions thereof respectively. A desired number of such lower level sections may be formed at desired portions of the conveyor.

The articles P are conveyed by the second conveyor 2, each with its length positioned longitudinally of the conveyor 2. To transfer the articles P sent forward by the first conveyor 1 onto the second conveyor 2 without changing the orientation of the articles P, the articles P are conveyed on the first conveyor 1, each with its width positioned longitudinally of the conveyor as already described. The articles P thus positioned on the first conveyor 1 are directly transferred onto the second conveyor 2. At this time the longitudinal center line of the article P must be brought into alignment with the center line of the second conveyor 2 correctly. In other words, the lugs 49 at the widthwise midportion of the article P must be positioned in the path of travel of the pushers 35 on the drive chain 19. Otherwise, it would be impossible for the pusher 35 to engage the article P to advance the same.

The provision of the lower level section 18a of the drive chain 18 in the front end of the first conveyor 1 as described above permits the articles P to be transferred from the first conveyor 1 onto the second conveyor 2 but does not always assure that the articles P will be brought to correct position on the second conveyor 2. Correct positioning of the articles can be achieved by pushing means 81 and receiving and transferring means 82 shown in FIGS. 1 and 2. The pushing means 81 comprises a rod 84 rotatably supported by vertical angle bars 83 fixed to the front ends of the two longitudinal bars of the first conveyor 1, pivotal bars 86 fixed to the opposite ends of the rod 84 respectively and each extending upward to carry a roller 85 at its upper end, an ear 87 extending upward from a portion of the rod 84 toward its one end, and a hydraulic cylinder 91 having a piston rod 88 whose end is pivoted to the ear 87 and a base end 89 pivoted to a cylinder holder 90. The receiving and transferring means 82 comprises two rods 93 included in the second conveyor 2 and supported by bearings 92 disposed forwardly of the first conveyor 1, the two rods 93 being spaced apart from each other by a specified distance, pivotal bars 95 fixed to each of the rods 93 proximate to its opposite ends and each extending upward to carry a roller 94 at the upper end thereof, downwardly extending levers 100 each fixed to one end of each rod 93 which end extends outward from the bearing 92, a pair of links 101 connecting the two levers 100, and a hydraulic cylinder 98 having a piston rod 96 whose distal end is pivoted to lengthwise midportion of one of the levers 100 and a base end 97 pivoted to the beam 6.

When the piston rod 88 is extended by the operation of the hydraulic cylinder 91, the pivotal bars 86 of the pushing means 81 are inclined rearward, bringing the rollers 85 at their upper ends to a level lower than the upper ends of the supporting rollers 10 as shown in the solid line in FIG. 2. When retracted, the piston rod 88 turns the pivotal bars 86 to upright position, bringing the rollers 85 to horizontal position above the upper ends of the supporting rollers 10 as indicated in the dot-and-dash line in FIG. 2. Thus when the pivotal bars 86 turn in a counterclockwise direction in FIG. 2 from inclined position to upright position, namely when the rollers 85 on the upper ends thereof shift from lower position to elevated position, the article P which has been sent out as already described is further pushed by the rollers 85 on its rear side, the rollers 85 thus acting to place the article P correctly on the second conveyor 2 when brought to their elevated position. Since the opening 47 is formed at the junction of the first conveyor 1 and the second conveyor 2, the article P which has been guided by the guide rails 28 may possibly be guided improperly and displaced sidewise at this position. While the articles P are travelling continuously on the conveyor 1, therefore, the pivotal bars 86 which are normally in upright position permit the horizontally positioned rollers 85 on their upper ends to guide one side of the article P when the article passes the opening portion 47. Further only when the article P is to be transferred from the first conveyor 1 onto the second conveyor 2, a limit switch and photoelectric tube or like detecting means detect that the article is brought close to the front end of the first conveyor 1 so that the pivotal bars 86 are inclined rearward temporarily before the article P is positioned above the pushing means 81. Upon lapse of a predetermined period of time, a timer actuates the pivotal bars 86 into the foregoing operation to send out the article P.

The hydraulic cylinder 98 operates to extend the piston rod 96, which in turn brings the pivotal bars 95 of the receiving and transferring means 82 to substantially upright position although unillustrated, thereby permitting the rollers 94 on their upper ends to assume a substantially vertical posture. In this state, the support pins of the rollers 94 are at right angles to those of the supporting rollers 11 on the second conveyor 2, and the rollers 94 are in alignment with the supporting rollers 10 on the first conveyor 1. Furthermore, the rollers 94 are positioned slightly above the supporting rollers 11 of the second conveyor 2 but at the same level as the supporting rollers 10 of the first conveyor 1. When retracted, the piston rod 96 inclines the pivotal bars 95 and brings the rollers 94 to a level lower than the supporting rollers 11. Before the article P is transferred from the first conveyor 1 onto the second conveyor 2, the four pivotal bars 95 are raised. Subsequently, the rollers 94 on their upper ends receive the article P sent out onto the second conveyor 2. The pivotal bars 95 are then turned to inclined position, namely the rollers 94 are brought from elevated position to lowered position to place the article P on the rollers 94 onto the supporting rollers 11. During the foregoing operation to transfer the articles P, the pusher 35 and lever 41 on the drive chain 19 would interfere with the article P when the article advances onto the second conveyor 2, if they should project above the elevated rollers 94 at the junction of the first and second conveyors 1 and 2. Accordingly, the path of movement of upper part of the drive chain 19 is set at a lower level than that of the drive chain 18, allowing the upper end of the pusher 35 to pass below the upper ends of the rollers 94 at their elevated position. The level of the supporting rollers 11 is therefore also determined in corresponding relation to the drive chain 19 which is in the above-mentioned relative position. To avoid the possible contact of the under surface of the article P with the pusher 35 and the lever 41 when the article P is to be transferred from the rollers 94 on the pivotal members 95 onto the supporting rollers 11, due consideration must be given to the space therebetween and to the movement of the receiving and transferring means 82 relative to the travel of the drive chain 19.

During the transfer operation described, there arises a need to stop a group of articles before the junction of the first and second conveyors 1 and 2 while the articles are being sent forward on the second conveyor 2. To this end, the stopping means may be provided at the position before the junction. It will be apparent that in the same manner as described with reference to FIGS. 9 and 10, the advancing articles will then be brought to a halt one after another in accumulated fashion.

The means for receiving and transferring the articles P may alternatively comprise an endless drive chain which is positioned in the second conveyor 2 transversely thereof in alignment with the first conveyor 1 or drive rollers having axes positioned longitudinally of the second conveyor 2, such alternative means being rendered movable upward and downward with respect to the upper ends of the supporting rollers 11.

Figure 16:
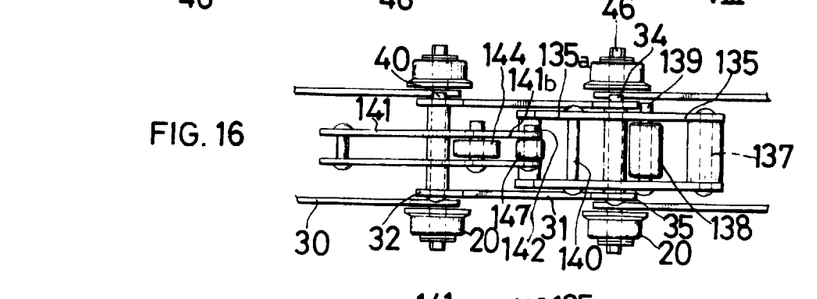
FIG. 16 is a plan view corresponding to FIG. 7 and showing a pusher and a lever for tilting the pusher of modified construction.
Figure 17:
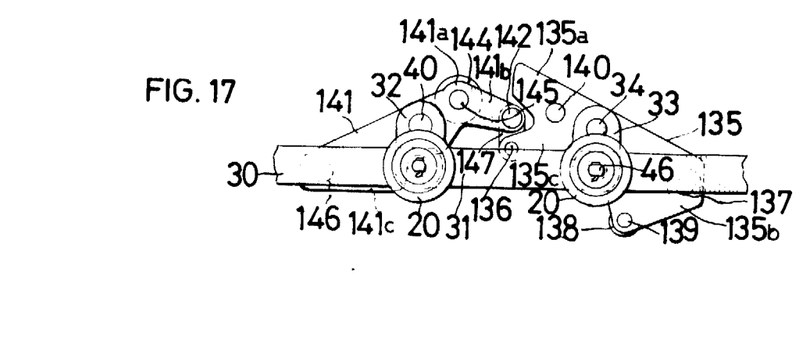
FIG. 17 is a side elevation of the drive chain of FIG. 16.

FIGS. 16 and 17 show modified constructions of the pusher and lever for tilting the pusher. A pusher 135 comprises two plates spaced apart by a distance greater than the width of the rails 51 and 52 on the article P and connected together by pins 136, 137 and 140. The pusher 135 has an upper projection 135a projecting straight but obliquely upward toward the front and engageable with lugs 49 and 50 of the article P, a lower projection 135b of a greater width carrying a roller 138 on a pin 139 at its lower end and projecting downward from the chain 18 or 19, and a front projection 135c extending horizontally forward approximately from intermediate position between the pivot 34 and the pin 46. A lever 141 is composed of two plates connected together by pins 142 and 146 and spaced by a smaller distance than the two plates of the pusher 135. The lever 141 has an upper projection 141a carrying a roller 144 on a pin 145 at its upper end, a rear projection 141b extending substantially horizontally from the upper projection 141a toward the pusher 135 and overlapping the front projection 135c of the pusher 135, and a lower projection 141c having a lower end slightly projecting from the lower end of the links 30 of the chain 18 or 19 and having a large width. A vertical link 147 interconnects the front projection 135c of the pusher 135 and the end of the rear projection 141b of the lever 141 by pins 142 and 136 at its upper and lower ends in pivotable manner. Thus connected by the link 147, the pusher 135 and lever 141 are rendered tiltable smoothly and reliably in operatively related fashion.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. A conveyor comprising a number of rotatable supporting members arranged in two rows longitudinally thereof, a drive chain interposed between the two rows of supporting members, pushers tiltably pivoted to the drive chain each at the approximate midportion of its length and spaced apart by a distance at least longer than articles to be conveyed and pusher tilting levers pivoted to the drive chain each at the approximate midportion of its length and positioned in front of the pushers in mating combination therewith, each of the pushers having an upper projection upwardly extending obliquely forwardly of the pivot therefor and engageable with the article, a lower projection serving as a weight and a front projection extending toward the lever, the pusher being prevented from turning rearward when in engagement with the article, each of the levers having an upper projection extending upward from the pivot therefor and contactable with the rear side of the article, a lower projection serving as a weight and a rear projection extending toward the pusher to overlap the front projection thereof, the lever being pushable downward by contact with a stopped article on the conveyor while travelling with the drive chain and to thereby tilt the mating pusher downward.

2. The conveyor as set forth in claim 1 wherein an interconnecting link is provided between the front projection of the pusher and the rear projection of the pusher tilting lever and is pivotally connected at its one end to the end of the front projection and at the other end thereof to the end of the rear projection by pins respectively.

3. The conveyor as set forth in claim 1 wherein the upper projection of the pusher tilting lever is provided at its upper end with a roller rotatable in contact with the under surface of the article stopped during conveyance.

4. The conveyor as set forth in claim 3 wherein the article to be conveyed is a pallet having lugs with which the pusher is engageable from inside, guide rails each extending between each pair of the lugs opposing each other to guide the roller on the pusher tilting lever and slider surfaces extending in parallel for movable contact with the rotatable supporting members of the conveyor.

5. The conveyor as set forth in claim 1 wherein the lower projection of the pusher extends below the drive chain and has a roller at its lower end.

6. The conveyor as set forth in claim 5 wherein stopping means is disposed in a specified portion of the conveyor and includes a cam positioned below the drive chain and upwardly movable into contact with the roller of the pusher to push up the lower projection of the pusher and to thereby bring down the upper projection thereof from a position where it is engageable with the article to a disengaged position, the cam further being downwardly movable away from the roller of the pusher in its raised position.

7. The conveyor as set forth in claim 1 wherein at least at the front end of the conveyor the path of travel of the drive chain has a lower level section longer than the dimension of the article in the direction of travel of the article, the lower level section being at a lower level than the other portion of the path of travel of the drive chain so as to permit the pusher to engage the article but to keep the lever out of contact with the article.

8. A conveyor comprising a number of rotatable supporting members arranged in two rows longitudinally thereof, a drive chain interposed between the two rows of supporting members, pushers tiltably pivoted to the drive chain each at the approximate midportion of its length and spaced apart by a distance at least longer than articles to be conveyed and pusher tilting levers pivoted to the drive chain each at the approximate midportion of its length and positioned in front of the pushers in mating combination therewith, each of the pushers having an upper projection upwardly extending obliquely forwardly of the pivot therefor and engageable with the article, a lower projection serving as a weight and a front projection extending toward the lever, the pusher being prevented from turning rearward when in engagement with the article each of the levers having an upper projection extending upward from the pivot therefor and contactable with the rear side of the article, a lower projection serving as a weight and a rear projection extending toward the pusher to overlap the front projection thereof, the lever being pushable downward by contact with a stopped article on the conveyor while traveling with the drive chain and to thereby tilt the mating pusher downward, wherein the stopping means is disposed in a specified portion of the conveyor and includes a cam positioned below the drive chain and upwardly movable into contact with the roller of the pusher to push up the lower projection of the pusher and to thereby bring down the upper projection thereof from a position where it is engageable with the article to a disengaged position, the cam further being downwardly movable away from the roller of the pusher in its raised position, and wherein the stopping means further includes a coasting arresting dog operable with the dog operable with the cam and upwardly movable into the path of travel of the article and downwardly movable out of the same path of travel.

9. The conveyor as set forth in claim 8 wherein pushing means is further disposed in the front end of the conveyor, the pushing means including pivotal members reciprocally movable between a lower position and an upper position with respect to the upper ends of rotatable supporting members of the conveyor, the pivotal members being operable to come into contact with and thereby push forward the rear end of article advanced by the pusher when moving upward from its lowered position so as to discharge the article completely from the conveyor when in its elevated position.

* * * * *